United States Patent [19]

Kennedy, Jr.

[11] 4,285,910

[45] Aug. 25, 1981

[54] CHEMICAL REACTOR, FLOW DISTRIBUTOR, SYSTEM AND METHOD

[76] Inventor: Alvin B. Kennedy, Jr., P.O. Box 282, Angleton, Tex. 77515

[21] Appl. No.: 87,014

[22] Filed: Oct. 22, 1979

[51] Int. Cl.³ .......................... B01J 8/02; B01J 19/02; B01J 19/24

[52] U.S. Cl. .................................. 422/219; 29/157 R; 261/97; 422/220; 422/311; 428/325; 428/328

[58] Field of Search ............... 422/211, 219, 220, 311; 428/323, 325, 328, 331; 261/97, 114 VT, DIG. 72; 29/157 R

[56] References Cited

U.S. PATENT DOCUMENTS

| | | | |
|---|---|---|---|
| 1,888,341 | 11/1932 | Winckler | 428/331 |
| 2,915,375 | 12/1959 | Shirk et al. | 422/220 |
| 3,146,189 | 8/1964 | Kunreuther et al. | 422/220 X |
| 3,322,608 | 5/1967 | Mason et al. | 428/331 X |
| 3,510,446 | 5/1970 | Junger et al. | 428/331 X |
| 3,560,167 | 2/1971 | Bruckner et al. | 422/220 |
| 3,789,885 | 2/1974 | Wilson | 428/323 X |

FOREIGN PATENT DOCUMENTS 231760 12/1960 Australia .................... 422/211

Primary Examiner—Bradley Garris
Attorney, Agent, or Firm—Guy E. Matthews

[57] ABSTRACT

A chemical reactor, flow distributor, system and method are disclosed. A plurality of chemically inert flow distributors are embedded in the receiving surface of a layer of chemically inert objects supported by a bed of catalytic material which is disposed within a chemical reactor. The flow distributors are constructed from spheres of chemically inert material interconnected to one another and defining a desirable geometric form having voids and interstices which provide passageways therethrough, the passageways permitting the reactants to pass in effectively distributed manner into the bed of catalytic material.

17 Claims, 4 Drawing Figures

CHEMICAL REACTOR, FLOW DISTRIBUTOR, SYSTEM AND METHOD

In the chemical processing and petroleum refining industries, chemical reactors are commonly used to change the chemical structure of fluid reactants by flowing the reactants through a bed of catalytic material. It is important in these reactors to have a uniform distribution of the fluid reactants through the bed of catalytic material or the optimum use of the catalytic material is not obtained. This uniform distribution is adversely affected by such things as localized flow of the reactants toward the shell of the reactor and the upper surface of the bed becoming plugged with dirt, rust, scale and other entrained foreign material.

A solution to this lack of uniform flow distribution has been to direct the fluid reactants over the entire surface of the catalytic bed by placing baffles at the shell inlet to deflect the incoming flow. Also, it has been suggested to use a plurality of spaced apart baskets on the inlet surface with each basket reaching through and penetrating into the contact bed. The reactant stream thus passes under the surface of the catalytic material to increase the surface area available to the incoming fluids. An example of this arrangement is explained in U.S. Pat. No. 3,685,971 by D. B. Carson. One problem with this solution is that it requires a special arrangement in the reactor, which will not solve the problem in pre-existing reactors.

Accordingly, it is a primary object of the present invention to provide a method and apparatus for inhibiting plugging of fluid reactants flowing through a chemical reactor.

Another feature of this invention concerns the provision of a method for inhibiting plugging of the catalyst bed which might otherwise prevent efficient flow of fluid reactants through a chemical catalytic reactor.

It is also a feature of this invention to provide a flow distributor for use in chemical catalytic reactors which can be employed efficiently in most existing chemical reactors.

In accordance with the invention, a system for inhibiting plugging of the flow of fluid reactants flowing through a chemical reactor comprises a bed of catalytic material positioned within the reactor for affecting the rate of chemical change in the incoming fluid reactants. A bed of chemically inert material is also positioned within the reactor for supporting the bed of catalytic material. A layer of singular inert flow distributor support elements is positioned in evenly distributed manner on the upper or receiving surface of the bed of catalytic material and may take the form of small spheres. A plurality of chemically inert flow distributors which may be of spherical or conical form or of some other suitable configuration are partially embedded in the upper or receiving surface of the layer of flow distributor support elements for increasing the surface area of the bed through which the incoming reactants must flow. Each flow distributor is constructed of chemically inert material in the form of spheres or objects of other geometrical configuration which are attached to one another and define voids or interstices which provide evenly distributed passageways therethrough, the passageways permitting the reactants to pass into the bed of catalytic material beneath its receiving surface.

In accordance with the invention, a chemical reactor includes a shell which has an inlet for receiving fluid reactants and an outlet for removing reacted fluid. A bed of catalytic material is located in the shell for affecting the rate of chemical change in the reactants and a bed of chemically inert material is disposed in the shell for supporting the bed of catalytic material. A layer of inert flow distributor support elements is placed in evenly distributed manner on the upper or receiving surface of the bed of catalytic material. The inert elements forming the layer of inert material are in the form of a suitable geometric configuration, such as spherical, for example. This layer of inert objects provides structural integrity to prevent heaving of the bed of catalytic material and also functions to define flow distributing interstices or passages to permit evenly distributed flow of reactant fluid into the bed of catalyst. A plurality of chemically inert flow distributors are embedded in the inlet side surface of the layer of inert material or objects for increasing the area through which the received fluid reactants flow into the catalyst bed. Each flow distributor is defined by a plurality of spheres of chemically inert material or objects of other suitable geometric form, which are interconnected to one another. These interconnected inert objects define voids which form interstices or passageways therethrough, the passageways permitting the reactants to pass into the bed of catalytic material beneath the inlet side surface.

In accordance with the invention, a method of inhibiting plugging of fluid reactants flowing through a chemical reactor includes passing the reactant fluid through a plurality of flow distributors which are partially embedded in a bed of chemically inert material positioned within the reactor shell through which the reactant fluid is also passed. The reactant fluid is then passed through a bed of catalytic material positioned on top of a supporting bed of chemically inert material thus causing reaction of incoming fluid reactants. The flow distributors are constructed by attaching objects of chemically inert material to one another and a plurality of these chemically inert flow distributors are embedded in the inlet side surface of the bed of inert material for increasing the distribution area into the bed of catalytic material.

In accordance with the invention, a plurality of flow distributors are employed in the chemical reactor and are adapted to be embedded in the inlet side surface of a bed or layer of inert material for increasing the area through which fluid reactants flow into the layer of inert and the bed of catalytic material. The flow distributor body is defined by interconnected objects formed of chemically inert material, such as ceramic, carbon steel, stainless steel, etc. These interconnected objects, which may be in the form of spheres, are attached to one another and define voids or interstices which provide passageways through the body. The passageways permit the incoming reactants to pass into the bed of catalytic material beneath its inlet side surface.

Other objects and advantages of the invention will become apparent upon reading the following detailed description and upon reference to the drawings, in which.

While the invention will be described in connection with exemplary embodiments and procedures, it will be understood that it is not intended to limit the invention to those embodiments and procedures. On the contrary, it is intended to cover all alternatives, modifications and equivalents that may be included within the spirit and scope of the invention as defined by the appended claims.

Figure 1:
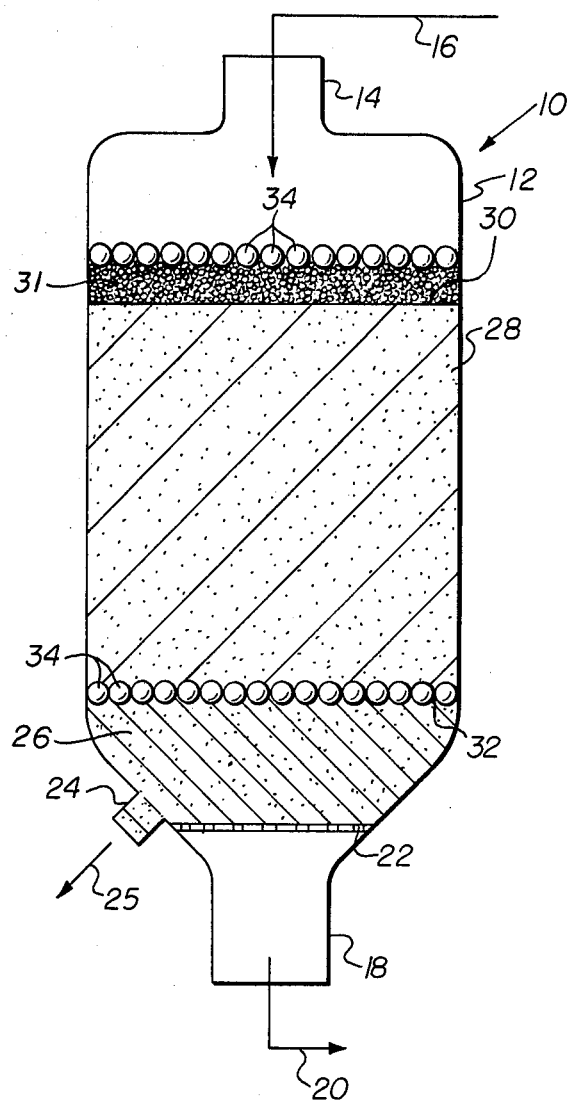
FIG. 1 is a schematic, elevational view of a chemical reactor constructed according to the present invention.

In FIG. 1, there is shown a chemical reactor 10 which is utilized in the petroleum refining or chemical processing industries, such as are used for the hydrodesulfurization of naphthas and distillates, naphtha reforming, hydrocracking of heavy oils, hydrogenation and hydroealkylation of aromatic stocks, and isomerization of normal paraffins. This reactor includes a shell 12 having an inlet 14 for receiving fluid reactants, as represented by line 16, and an outlet 18 for removing reacted fluid, as represented by line 20. A grate 22 is located in a lower portion of shell 12 and extends transversely across outlet 18. A dump opening 24 is provided above grating 22 for removing the materials, as represented by arrow 25, prior to recharging the reactor.

A supporting bed of chemically inert material 26 is disposed in shell 12 on top of grating 22. This material is well known and the bed is typically formed from a plurality of ceramic balls between ½ and ¾ inch in diameter.

A bed of catalytic material 28 for affecting the rate of chemical change in the fluid reactants is disposed in the shell 12 and is supported by the bed of chemically inert material 26. Bed 28 has an inlet side surface 30 which extends substantially transverse to the incoming flow of fluid reactants through inlet 14 and an outlet side surface 32 which extends substantially transverse to the reacted fluid flow through outlet 18. Usually a layer of inert balls or objects 31 of other suitable geometric form will be positioned immediately above the bed of catalytic material 28, with the spheres or other flow distributors 34 positioned thereon.

A plurality of chemically inert flow distributors 34 are embedded in inlet side surface 30 of the layer of inert objects 31 for increasing the area through which the fluid reactants flow into bed 28. When the fluid reactants flow in a direction opposite to that represented by lines 16 and 20, flow distributors 34 may be provided in surface 32. Each flow distributor 34 should have a dimension sufficiently small to permit removal through dump opening 24 along with the catalytic and chemically inert materials for removal when recharging reactor 10.

Figure 2:
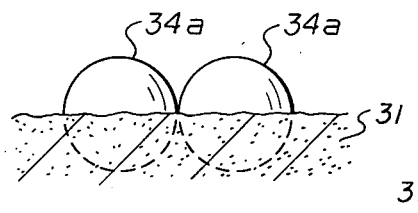
FIG. 2 is an enlarged view of one embodiment of flow distributors embedded in the bed or layer of inert objects that is located in the chemical reactor shown in FIG. 1.

As shown in FIG. 2, flow distributors 34A may be constructed in a spherical shape and embedded in bed 31 no deeper than the diameter of the sphere.

Alternatively, flow distributors 34A may be semispherical and simply positioned on top of bed 31 and not embedded therein.

Figure 3:
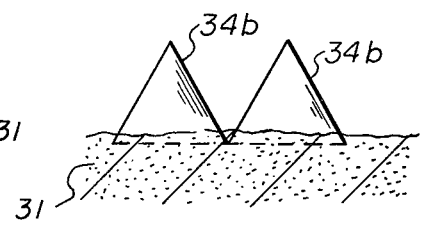
FIG. 3 is an enlarged view of a second embodiment of flow distributors embedded in the bed or layer of inert objects that is located in the chemical reactor shown in FIG. 1.

As shown in FIG. 3, the flow distributors 34B may be constructed in pyramidal shape with the base of each distributor being positioned on top of bed 31, facing away from the receiving surface.

Figure 4:
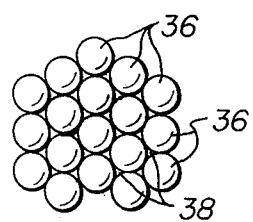
FIG. 4 is an enlarged fragmentary view showing the construction of the flow distributors shown in FIGS. 2 and 3.

As shown in FIG. 4, regardless of the desired configuration, each flow distributor 34 is constructed from objects 36 of chemically inert material, such as carbon steel, ceramic, stainless steel, etc., attached to one another. The objects 36 may conveniently take the form of spheres as shown or some other suitable geometric configuration. This construction creates voids or interstices 38 between spheres 36 which form passageways through each flow distributor. The incoming reactants thereby pass through the passageways, through the layer of inert material and into the bed of catalytic material 28 beneath its receiving surface 30. Thus, the incoming chemical reactants pass through each distributor 34 into bed 28 to thereby increase the effective surface area of receiving surface 30 into bed 28.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matters herein set forth or shown in the accompanying drawings are to be interpreted as illustrative and not in a limiting sense.

The invention having been described, what is claimed is:

1. A system for inhibiting plugging of fluid reactants flowing through a chemical reactor, comprising:
    (a) a bed of catalytic material mounted in said reactor for affecting the rate of chemical change in the incoming fluid reactants;
    (b) a bed of chemically inert material mounted in said reactor for supporting said bed of catalytic material;
    (c) a layer of chemically inert material covering said bed of catalytic material;
    (d) a plurality of chemically inert flow distributors embedded in the receiving surface of said layer of chemically inert material; and
    (e) each of said flow distributors being constructed from objects of substantially chemically inert material interconnected to one another for creating voids and interstices which provide passageways therethrough, the passageways permitting the reactants to pass into the bed of catalytic material beneath its receiving surface.

2. The system as set forth in claim 1, wherein said reactor includes a dump opening through which the catalytic material and chemically inert material are removed prior to recharging the reactor, said chemically inert flow distributors having a dimension sufficiently small to permit removal through said dump opening.

3. The system as set forth in claim 1, wherein each of said flow distributors is pyramidal in shape, each flow distributor being embedded in said layer of chemically inert material with the base generally facing the receiving surface of said catalytic material.

4. The system as set forth in claim 1, wherein each of said flow distributor is of generally spherical configuration, each distributor being at least partially embedded in said layer of chemically inert material.

5. The system as set forth in claim 1, wherein said bed of chemically inert material is defined by spherical objects, and each of said chemically inert flow distributors being defined by spheres of chemically inert material.

6. A chemical reactor, comprising:
(a) a shell having
   (i) an inlet for receiving fluid reactants; and
   (ii) an outlet for removing reacted fluid;
(b) a bed of catalytic material positioned within said shell for affecting the rate of chemical change in the reactants;
(c) a bed of chemically inert material disposed in said shell for supporting said bed of catalytic material;
(d) a layer of chemically inert objects being supported by said bed of catalytic material;
(e) a plurality of chemically inert flow distributors embedded in the inlet side surface of the layer of chemically inert objects; and
(f) each flow distributor being constructed from objects of chemically inert material attached to one another for creating voids and interstices which provide passageways therethrough, said passageways permitting the reactants to pass into the bed of catalytic material beneath the inlet side surface.

7. The reactor as set forth in claim 6, wherein said shell includes a dump opening through which the catalytic material and chemically inert material are removed prior to recharging said reactor, said chemically inert flow distributors having a dimension sufficiently small to permit removal through said dump opening.

8. The reactor as set forth in claim 6, wherein each chemically inert flow distributor is pyramidal in shape and is embedded in said layer of chemically inert objects with the base generally facing the inlet surface of said bed of catalytic material.

9. The reactor as set forth in claim 6, wherein each chemically inert flow distributor is spherical in shape and is embedded in said layer of chemically inert objects no deeper than the diameter thereof.

10. The reactor as set forth in claim 6, wherein said bed of chemically inert material is defined by spheres, and each chemically inert flow distributor is constructed from the same chemically inert material as the objects defining the bed of chemically inert material.

11. A method of filling a reactor shell to form a chemical reactor to inhibit the plugging of fluid reactants flowing through the chemical reactor, comprising the steps of:

positioning a bed of chemically inert material within the reactor shell;

mounting a bed of catalytic material on top of said bed of chemically inert material for causing incoming fluid reactants to react chemically;

positioning a layer of loose chemically inert objects in evenly distributed manner against the inlet surface defined by said bed of catalytic material;

attaching objects of chemically inert material to one another in such manner as to define a flow distributor; and embedding a plurality of the chemically inert flow distributors in the inlet side surface of said layer of chemically inert objects.

12. The method as set forth in claim 11, wherein the spheres are attached to one another to form a pyramidal geometric configuration, and each distributor is embedded with the base of the pyramidal shape generally facing the inlet side surface of said bed of catalytic material.

13. The method as set forth in claim 11, wherein the spheres are attached to one another to form a spherical shape, and each distributor is generally embedded no deeper than the diameter of the spherical shape.

14. The system as claimed in claim 1, wherein each of said objects of substantially chemically inert material is of spherical shape.

15. The system as claimed in claim 1, wherein said flow distributors are arranged on said surface in touching fashion.

16. The reactor as claimed in claim 6, wherein each of said objects of substantially chemically inert material is of spherical shape.

17. The method as claimed in claim 11, wherein said objects of chemically inert material are of spherical shape.

* * * * *